(12) United States Patent  
Tsilimantos et al.

(10) Patent No.: US 11,109,022 B2  
(45) Date of Patent: Aug. 31, 2021

(54) TRANSMITTER COMMUNICATION DEVICE AND METHOD FOR TRANSMITTING VIDEO DATA

(71) Applicant: Huawei Technologies Co., Ltd., Shenzhen (CN)

(72) Inventors: Dimitrios Tsilimantos, Boulogne Billancourt (FR); Zhijun Chao, Shanghai (CN); Afef Feki, Munich (DE); Amaya Nogales Gomez, Munich (DE); Xianwen Shi, Shenzhen (CN); Haifeng Tang, Shenzhen (CN); Stefan Valentin, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/708,097

(22) Filed: Dec. 9, 2019

(65) Prior Publication Data

US 2020/0112721 A1 Apr. 9, 2020

Related U.S. Application Data

(63) Continuation of application No. PCT/EP2017/064167, filed on Jun. 9, 2017.

(51) Int. Cl.
*H04N 19/109* (2014.01)
*H04N 19/159* (2014.01)
(Continued)

(52) U.S. Cl.
CPC ......... *H04N 19/109* (2014.11); *H04L 65/607* (2013.01); *H04L 65/80* (2013.01);
(Continued)

(58) Field of Classification Search
CPC .. H04N 19/109; H04N 19/159; H04N 19/172; H04N 19/177; H04N 21/234381;
(Continued)

(56) References Cited

U.S. PATENT DOCUMENTS

| 8,848,562 | B2 | 9/2014 | Kotecha et al. | |
|---|---|---|---|---|
| 2002/0181595 | A1* | 12/2002 | Obata | H04N 19/159 375/240.25 |

(Continued)

FOREIGN PATENT DOCUMENTS

| CN | 101091390 A | 12/2007 |
|---|---|---|
| CN | 101803228 A | 8/2010 |

(Continued)

OTHER PUBLICATIONS

Radhakrishnan et al., "Channel quality-based AMC and smart scheduling scheme for SVC video transmission in LTE MBSFN networks," 2nd IEEE International Workshop on Smart Communication Protocols and Algorithms, Ottawa, Canada, pp. 6514-6518, Institute of Electrical and Electronics Engineers, New York, New York (Jun. 10-15, 2012).

(Continued)

*Primary Examiner* — Marnie A Matt
(74) *Attorney, Agent, or Firm* — Leydig, Voit & Mayer, Ltd.

(57) ABSTRACT

The application relates to a method and a transmitter communication device configured to provide video data to a receiver communication device, wherein the video data comprises one or more groups of frames and each group of frames comprises a plurality of temporally successive frames. The method comprises processing a first frame of a current, i.e. currently processed group of frames using a first modulation and coding scheme of a plurality of modulation and coding schemes and processing a second frame of the (Continued)

current group of frames using a second modulation and coding scheme of the plurality of modulation and coding schemes, and further selecting the second modulation and coding scheme of the plurality of modulation and coding schemes on the basis of a temporal position of the second frame relative to the first frame of the current group of frames.

20 Claims, 8 Drawing Sheets

(51) Int. Cl.
  *H04N 19/172*   (2014.01)
  *H04N 19/177*   (2014.01)
  *H04L 29/06*   (2006.01)

(52) U.S. Cl.
  CPC ......... *H04N 19/159* (2014.11); *H04N 19/172* (2014.11); *H04N 19/177* (2014.11)

(58) Field of Classification Search
  CPC ........... H04N 21/2383; H04N 21/2402; H04N 21/631; H04N 21/6131; H04L 65/607; H04L 65/80; H04L 65/602
  USPC .................................................... 375/240.15
  See application file for complete search history.

(56) References Cited

U.S. PATENT DOCUMENTS

| | | | |
|---|---|---|---|
| 2010/0285742 | A1 | 11/2010 | Wang et al. |
| 2011/0267951 | A1 | 11/2011 | Stanwood et al. |
| 2012/0142385 | A1 | 6/2012 | Choi et al. |
| 2013/0155935 | A1 | 6/2013 | Zhang et al. |
| 2014/0133303 | A1 | 5/2014 | Jia et al. |
| 2014/0233413 | A1 | 8/2014 | Dahod et al. |
| 2017/0171606 | A1* | 6/2017 | Lee .................... H04N 21/4384 |
| 2018/0183620 | A1 | 6/2018 | Huang et al. |

FOREIGN PATENT DOCUMENTS

| | | | | |
|---|---|---|---|---|
| CN | 102170647 | A | 8/2011 | |
| CN | 103248884 | A | 8/2013 | |
| CN | 104737483 | A | 6/2015 | |
| CN | 105025249 | A | 11/2015 | |
| CN | 105406945 | A | 3/2016 | |
| KR | 20120018191 | A | 2/2012 | |
| WO | WO-2018224172 | | * 12/2018 | ............. H04L 29/06 |

OTHER PUBLICATIONS

Pande et al., "Quality-Oriented Video Delivery over LTE Using Adaptive Modulation and Coding," 2011 IEEE Global Telecommunications Conference (GLOBECOM 2011), Houston, TX, pp. 1-5, Institute of Electrical and Electronics Engineers, New York, New York (2011).

Christodoulou et al., "Adaptive Subframe Allocation for Next Generation Multimedia Delivery Over Hybrid LTE Unicast Broadcast," IEEE Transactions on Broadcasting, vol. 62, No. 3, pp. 540-551, Institute of Electrical and Electronics Engineers, New York, New York (Sep. 2016).

"5G White Paper," 5G Initiative Team, pp. 1-125, Next Generation Mobile Networks Alliance, Frankfurt, Germany (Feb. 17, 2015).

"3rd Generation Partnership Project; Technical Specification Group Services and System Aspects; Policy and charging control architecture (Release 14)," 3GPP TS 23.203 V14.3.0, pp. 1-256, 3rd Generation Partnership Project, Valbonne, France (Mar. 2017).

"3rd Generation Partnership Project; Technical Specification Group Radio Access Network; Evolved Universal Terrestrial Radio Access (E-UTRA); Physical layer procedures (Release 14)," 3GPP TS 36.213 V14.1.0, pp. 1-414, 3rd Generation Partnership Project, Valbonne, France (Dec. 2016).

Zhao et al., "SSIM-based cross-layer optimized video streaming over LTE downlink," 2014 IEEE Global Communications Conference, Austin, TX, pp. 1394-1399, Institute of Electrical and Electronics Engineers, New York, New York (2014).

"Advanced video coding for generic audiovisual services," ITU-T Recommendation H.264, pp. 1-804, International Telecommunication Union, Geneva, Switzerland (Oct. 2016).

Yoon et al., "Video Multicast With Joint Resource Allocation and Adaptive Modulation and Coding in 4G Networks," IEEE/ACM Transactions on Networking, vol. 22, No. 5, pp. 1531-1544, Institute of Electrical and Electronics Engineers, New York, New York (Oct. 2014).

Richardson, "The H.264 Advanced Video Compression Standard," pp. 1-348, Wiley Publishing, New York, New York (Apr. 2010).

Gomez et al., "Unequal error protection for ViLTE via MCS-index adaptation," Huawei Technologies Co., Ltd., Shenzhen, PR China (Jan. 26, 2017).

Proust et al., "ViLTE quality and codecs issues", Proceedings of ViLTE Summit, Paris, France, pp. 1-12, Orange Labs, Anaheim, California (Dec. 16, 2015).

"New WID on Further enhancements on Video Enhancements for LTE," 3GPP TSG RAN Meeting #75, Dubrovnik, Croatia, RP-170781, pp. 1-4, 3rd Generation Partnership Project, Valbonne, France (Mar. 6-9, 2017).

Grange et al.,"VP9 Bitstream and Decoding Process Specification Version 0.6," Google Inc., Menlo Park, California (Mar. 31, 2016).

"Line Transmission of Non-Telephone Signals," ITU-T Recommendation H.261, pp. 1-29, International Telecommunication Union, Geneva, Switzerland (Mar. 1993).

"Advanced video coding for generic audiovisual services Series H: Audiovisual and Multimedia Systems Infrastructure of audiovisual services—Coding of moving video," ITU-T Recommendation H.264, pp. 1-812, International Telecommunication Union, Geneva, Switzerland (Apr. 2017).

"High efficiency video coding Series H: Audiovisual and Multimedia Systems Infrastructure of audiovisual services—Coding of moving video," ITU-T Recommendation H.265, pp. 1-664, International Telecommunication Union, Geneva, Switzerland (Dec. 2016).

* cited by examiner

| Name | Description |
|---|---|
| $Q$ | Available slots in a LTE frame |
| $\tau$ | LTE frame duration |
| $M$ | Maximum MCS index |
| $J$ | Number of frames in a GOP |
| $G$ | Number of P-frames in a GOP, i.e. $J-1$ |
| $P_j$ | Sequence of P-frames in a GOP |
| $\Omega$ | Inter-frame time |
| $T$ | Total number of slots available for transmitting a GOP $\lfloor \Omega J Q / \tau \rfloor$ |
| $L_j$ | Length of video frame $j$ |
| $R_m$ | Bytes that can be delivered in one slot with MCS $m$ |
| $j$ | Input: video frame index, $0 \leq j \leq G$ |
| $m'$ | Input: user MCS index, constant for the transmission of $j \in [0,...,G]$ |
| $m$ | Output: $(m_0,...,m_G)$ MCS transmission index for each video frame in a GOP |

Fig. 3

TRANSMITTER COMMUNICATION DEVICE AND METHOD FOR TRANSMITTING VIDEO DATA

CROSS-REFERENCE TO RELATED APPLICATIONS

This application is a continuation of International Patent Application No. PCT/EP2017/064167 filed on Jun. 9, 2017, the disclosure of which is hereby incorporated by reference in its entirety.

TECHNICAL FIELD

Generally, the present application relates to the field of telecommunications. More specifically, embodiments of the present application relate to a transmitter communication device and method for transmitting video data.

BACKGROUND

More and more real-time video traffic is generated in mobile networks by applications such as video telephony, live video streaming and cloud rendering. To reach a sufficient Quality of Experience (QoE), these applications require round-trip-times (RTTs) in the order of tens to hundreds of milliseconds. Compared to typical RTTs, this is a tight delay budget that is challenging to meet. As a result, delay, i.e., RTT and jitter have become the main QoE factors for real-time video in the Internet.

In mobile networks, keeping the RTT within the delay budget always reduces the average spectral efficiency. In order to transmit packets on time, a user equipment (UE) has to be served even at low signal-to-interference-plus-noise ratio (SINR). Low SINR may result from radio signal attenuation in tunnels, inside or between buildings or at the border of a base station's service area (the so-called cell edge), where the interference from neighbouring cells may be an additional factor for SINR reduction. Measurements show that a single video call, executed at the cell edge at medium quality, typically consumes 20% of the LTE uplink capacity.

While in these cases the SINR reduction remains until the user has left the area of poor coverage, short-term reductions of SINR may occur in any area due to radio propagation effects known as shadowing and fading. Due to the tight delay budget, even these short-term effects generate SINR reductions at a time scale that is relevant for real-time video traffic.

Consequently, a reduction of spectral efficiency is the inevitable result of a strict delay budget in mobile networks. This trade-off between data rate and delay is fundamental, since avoiding latency requires serving an UE even at low SINR. In general, this trade-off cannot be resolved by dynamic scheduling. Even if the base station applies algorithms such as max-rate scheduling and proportional fair scheduling, a tight delay budget forces the scheduler to allocate sufficient channel resources to the UE at low SINR. Since waiting for an increased SINR is generally not an option, a lower SINR requires the allocation of more channel resources (bandwidth, antennas, transmit power). This results in low spectral efficiency no matter if guaranteed bitrate (GBR) scheduling (e.g., using a round-robin scheduling algorithm) or non-GBR scheduling (e.g., using a dynamic scheduling algorithm) is used.

In general, current mobile networks either sacrifice spectral efficiency for improving QoE, by assigning Quality Class Identifiers (QCIs) that enforce a lower packet delay budget and/or a minimum bitrate constraint for the scheduling algorithm or sacrifice QoE for improving spectral efficiency, by limiting the amount of channel resources that is allocated to real-time video traffic (e.g., by confining this traffic to a dedicated logical channel as a radio bearer). Although none of these approaches is satisfactory, options are limited due to the fundamental nature of the trade-off described above.

As a consequence of this unsatisfactory situation, some research has focused on minimizing the spectral efficiency loss while still providing an acceptable QoE. One approach to implement such video-aware rate adjustment is the selection of the Modulation and Coding Scheme (MCS) of an Adaptive Modulation and Coding (AMC) scheme, according to characteristics of the currently transmitted video packets.

The approach disclosed in L. Christodoulou, O. Abdul-Hameed, A. M. Kondoz and J. Calic, "Adaptive Subframe Allocation for Next Generation Multimedia Delivery Over Hybrid LTE Unicast Broadcast," in IEEE Transactions on Broadcasting, vol. 62, no. 3, pp. 540-551, September 2016 focuses on MCS selection for Evolved Multimedia Broadcast Multicast Service (eMBMS). The main disadvantage of this approach is that the same MCS is allocated to all users served via eMBMS. This does not allow for an efficient channel adaptation. For instance, it is considered that the minimum MCS is allocated to all served users, which unnecessarily reduces the spectral efficiency for all users not operating in the lowest supported SINR range. This unnecessary reduction can be as high as 48 times in networks following the latest LTE standard. Since this loss keeps increasing with higher physical-layer rates, this approach is unacceptable for future generations of cellular networks.

Another approach disclosed in US20130155935 selects a MCS by jointly considering the time varying channel states and the effect of Block Error Rate (BLER) on the video packet loss rate (PLR). A drawback of this method is that the relevance of the video packet for the source decoder is not considered and all video packets are treated equally, regardless if they are critical or irrelevant for the decoding quality.

The approach disclosed in R. Radhakrishnan, B. Tirouvengadam and A. Nayak, "Channel quality-based AMC and smart scheduling scheme for SVC video transmission in LTE MBSFN networks," 2012 IEEE International Conference on Communications (ICC), Ottawa, ON, 2012, pp. 6514-6518 is based on Scalable Video Coding (SVC), which uses different encoding layers to simultaneously transmit multiple quality levels.

The approach disclosed in A. Pande, V. Ramamurthi and P. Mohapatra, "Quality-Oriented Video Delivery over LTE Using Adaptive Modulation and Coding," 2011 IEEE Global Telecommunications Conference—GLOBECOM 2011, Houston, Tex., USA, 2011, pp. 1-5 relates to a MCS adjustment based on QoE-measurements after decoding at the client. Such adjustment requires the clients to (i) perform QoE measurements that are standardized or at least comparable on the same scale and (ii) to feed-back these measurements to the base station, where the MCS is adjusted. Specific video parameters are not considered in the adaptation. Given the fact that (i) is a very diverse field where no standards for automatic QoE assessment exist and (ii) will generate signaling overhead and delay, both assumptions might lack practicality.

Thus, there is a need for an improved transmitter communication device for transmitting video data.

SUMMARY

It is an object of the application to provide an improved transmitter communication device for transmitting video data.

The foregoing and other objects are achieved by the subject matter of the independent claims. Further implementation forms are apparent from the dependent claims, the description and the figures.

According to a first aspect the application relates to a transmitter communication device configured to provide video data to a receiver communication device, wherein the video data comprises one or more groups of frames and each group of frames comprises a plurality of temporally successive frames. The transmitter communication device comprises a processor configured to process a first frame of a current, i.e. currently processed group of frames using a first modulation and coding scheme (MCS) of a plurality of modulation and coding schemes (MCS) and to process a second frame of the current group of frames using a second modulation and coding scheme (MCS) of the plurality of modulation and coding schemes (MCS), wherein the processor is configured to select the second modulation and coding scheme (MCS) of the plurality of modulation and coding schemes (MCS) on the basis of a temporal position of the second frame relative to the first frame of the current group of frames. The transmitter communication device further comprises a communication interface configured to transmit the current group of frames including the first frame and the second frame to the receiver communication device. The transmitter communication device can be, for instance, a base station or a user equipment of a wireless communication network. The receiver communication device can be, for instance, a user equipment with a display for displaying the video data forwarded by the transmitter communication device.

Thus, an improved transmitter communication device for transmitting video data is provided, which allows adjusting the MCS and, thus, the spectral efficiency for the different video data frames.

In a further implementation form of the first aspect, the first frame of the current group of frames temporally precedes the second frame of the current group of frames and wherein the second modulation and coding scheme (MCS) is spectrally more efficient than the first modulation and coding scheme (MCS).

In a further implementation form of the first aspect, the processor is configured to identify the first modulation and coding scheme using a first integer index, in particular a first MCS index, and the second modulation and coding scheme using a second integer index, in particular a second MCS index, wherein the first integer index is smaller than the second integer index.

In a further implementation form of the first aspect, the transmitter communication device further comprises a memory configured to store a table containing a plurality of integer indices, in particular MCS indices, wherein each integer index is associated with, i.e. points to a respective modulation and coding scheme (MCS) of the plurality of modulation and coding schemes.

In a further implementation form of the first aspect, the processor is configured to select the second modulation and coding scheme of the plurality of modulation and coding schemes on the basis of the temporal position of the second frame relative to the first frame of the current group of frames by adding a positive integer offset value to the first integer index for obtaining the second integer index identifying the second modulation and coding scheme.

In a further implementation form of the first aspect, the processor is configured to select the second modulation and coding scheme of the plurality of modulation and coding schemes on the basis of the temporal position of the second frame relative to the first frame of the current group of frames by subtracting a first positive integer offset value from a reference integer index for obtaining the first integer index and subtracting a second positive integer offset value from the reference integer index for obtaining the second integer index identifying the second modulation and coding scheme, wherein the second positive integer offset value is smaller than the first positive integer offset value.

In a further implementation form of the first aspect, the processor is configured to select the second modulation and coding scheme of the plurality of modulation and coding schemes on the basis of the temporal position of the second frame relative to the first frame of the current group of frames by adding a first integer offset value to a reference integer index for obtaining the first integer index and adding a second integer offset value to the reference integer index for obtaining the second integer index identifying the second modulation and coding scheme, wherein the second integer offset value is greater than the first integer offset value and where each integer offset can be positive, negative or zero.

In a further implementation form of the first aspect, the processor is further configured to generate a modified current group of frames by removing the second frame from the current group of frames and wherein the communication interface is configured to transmit the modified current group of frames to the receiver communication device.

In a further implementation form of the first aspect, the processor is configured to remove the second frame from the current group of frames, in response to a synchronization request from the receiver communication device. A synchronization request from the receiver communication device can be observed by the transmitter communication device (i) directly as a signal (e.g., from uplink) or (ii) indirectly from a response to the synchronization request (i.e., an instantaneous decoding refresh (IDR) frame placed in the video stream by a video data provider).

In a further implementation form of the first aspect, the first frame of the current group of frames is an intra-coded frame (I-frame) and the second frame of the current group of frames is a predictive-coded frame (P-frame) or a bidirectional predictive coded frame (B-frame).

In a further implementation form of the first aspect, the processor is configured to select the second modulation and coding scheme of the plurality of modulation and coding schemes on the basis of the temporal position of the second frame relative to the first frame of the current group of frames and on the basis of a profile associated with the receiver communication device. In an implementation form the profile associated with the receiver communication device can be a profile of a user of the receiver communication device defining user-specific quality-of-experience requirements.

In a further implementation form of the first aspect, the first frame is the temporally first frame of the current group of frames and the processor is further configured to select the first modulation and coding scheme of the plurality of modulation and coding schemes on the basis of a quality measure, in particular a SINR of a communication channel between the transmitter communication device and the receiver communication device. In an implementation form this function can be provided by an adaptive modulation and coding (AMC) unit.

In a further implementation form of the first aspect, the communication interface is configured to receive the video data from a video data provider and the processor is further configured to extract the temporal position of the second frame and a temporal position of the first frame of the current group of frames from the video data provided by the video data provider. The video data provider could be, for instance, an internet server or another user equipment.

According to a second aspect the application relates to a corresponding method for providing video data to a receiver communication device, wherein the video data comprises one or more groups of frames and each group of frames comprises a plurality of temporally successive frames. The method comprises the steps of: processing a first frame of a current, i.e. currently processed group of frames using a first modulation and coding scheme of a plurality of modulation and coding schemes and a second frame of the current group of frames using a second modulation and coding scheme of the plurality of modulation and coding schemes, wherein the second modulation and coding scheme of the plurality of modulation and coding schemes is selected on the basis of a temporal position of the second frame relative to the first frame of the current group of frames; and transmitting the current group of frames including the first frame and the second frame to the receiver communication device.

Thus, an improved method for transmitting video data is provided, which allows adjusting the MCS and, thus, the spectral efficiency for the different video data frames.

The method according to the second aspect of the application can be performed by the transmitter communication device according to the first aspect of the application. Further features of the method according to the second aspect of the application result directly from the functionality of the transmitter communication device according to the first aspect of the application and its different implementation forms.

According to a third aspect the application relates to a computer program comprising program code for performing the method according to the second aspect when executed on a computer.

The application can be implemented in hardware and/or software.

Embodiments of the application allow adjusting the MCS at which a base station transmits a packet that contains video data. This adjustment is done according to the relative temporal position of the contained data in the video stream. This approach is based on the fundamental property of video coding that earlier video frames are of higher relevance than frames occurring later in a video frame. This property results from the so-called inter-frame coding, where differences between consecutive full pictures (so-called I frames) are represented as motion vectors that are included in intermediate so-called P-frames (or Delta-frames). Since representing motion differences typically requires fewer bits than needed for a complete picture, inter-frame coding highly improves coding efficiency but also introduces a temporal dependency between the frames of a video stream.

Embodiments of the application can use an unequal error protection via adaptive modulation and coding. By exploiting fundamental spatial and temporal coding properties, the adjustment, e.g. increase of MCS for optimally selected video packets provides higher spectral efficiency without quality of experience (QoE) penalty for video users. This cannot be achieved without frame differentiation, since an error in critical packets such as I-frames will affect a significant duration of the video. In case congestion occurs, embodiments of the application allow discarding the transmission of the last P-frames in the group of frames, allowing fast recovery of I-frame packets. This results in fast resynchronization without wasting resources on unnecessary packets and, thus, leads to higher QoE since the rebuffering time is reduced.

Embodiments of the application can adjust, e.g. increase the MCS independently for each user. This feature provided by embodiments of the application is highly advantageous for an optimal video delivery in unicast scenarios with multiple users. Such a scenario is standard for most real-time video services, e.g. video telephony, ViLTE, live streaming and virtual reality video. Moreover, this feature provided by embodiments of the application allows exploiting multi-user diversity to improve cell spectral efficiency and can be adjusted to user-specific specific QoE profiles. As a result, embodiments of the application can provide higher spectral efficiency in both uplink and downlink directions.

BRIEF DESCRIPTION OF THE DRAWINGS

Further embodiments of the application will be described with respect to the following figures, wherein:

FIG. 3 shows a table defining some notation used for describing a MCS adjustment scheme implemented in a transmitter communication device according to an embodiment;

In the various figures, identical reference signs will be used for identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which the present application may be placed. It is understood that other aspects may be utilized and structural or logical changes may be made without departing from the scope of the application. The following detailed description, therefore, is not to be taken in a limiting sense, as the scope of the application is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
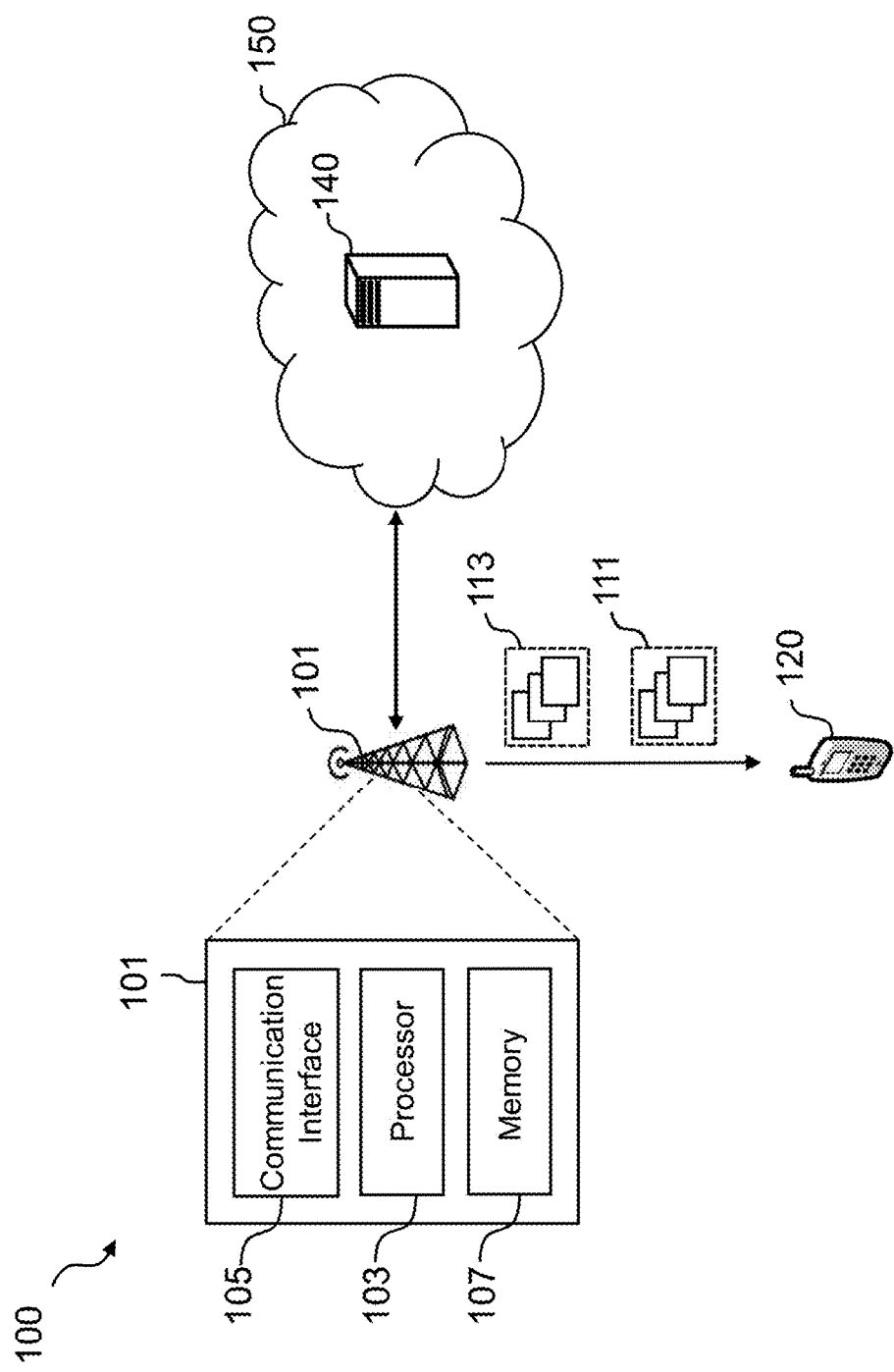
FIG. 1 shows a schematic diagram illustrating a wireless communication network comprising a transmitter communication device according to an embodiment.

FIG. 1 shows a schematic diagram of illustrating a wireless communication network 100 comprising a transmitter communication device 101 according to an embodiment and a receiver communication device. As illustrated in FIG. 1, according to an embodiment the transmitter communication device 101 can be, for instance, a base station and the receiver communication device 120 can be a user equipment of the wireless communication network 100. Alternatively, the transmitter communication device 101 can be a user equipment as well. The receiver communication device 120 can be, for instance, a smartphone with a display for displaying the video data forwarded by the transmitter communication device 101.

The transmitter communication device 101 is configured to provide video data to the receiver communication device 120, for instance, video data provided by a video data provider 140 located in the Internet 150, wherein the video data comprises one or more groups of frames and each group of frames comprises a plurality of temporally successive frames. By way of example, two groups of frames 111 and 113 are illustrated in FIG. 1. In another embodiment, the video data can comprise only a single group of frames comprising a plurality of temporally successive video data frames.

As illustrated in FIG. 1, the transmitter communication device 101 comprises a processor 103 configured to process a first frame of a currently processed group of frames using a first modulation and coding scheme (MCS) and to process a second frame of the current group of frames using a second MCS, wherein the processor 103 is configured to select the second MCS on the basis of a temporal position of the second frame relative to the first frame of the current group of frames. The transmitter communication device 101 further comprises a communication interface 105 configured to transmit the current group of frames including the first frame and the second frame to the receiver communication device 120.

In an embodiment, the processor 103 is further configured to extract the temporal position of the second frame and a temporal position of the first frame of the current group of frames from the video data provided by the video data provider 140.

Figure 2:
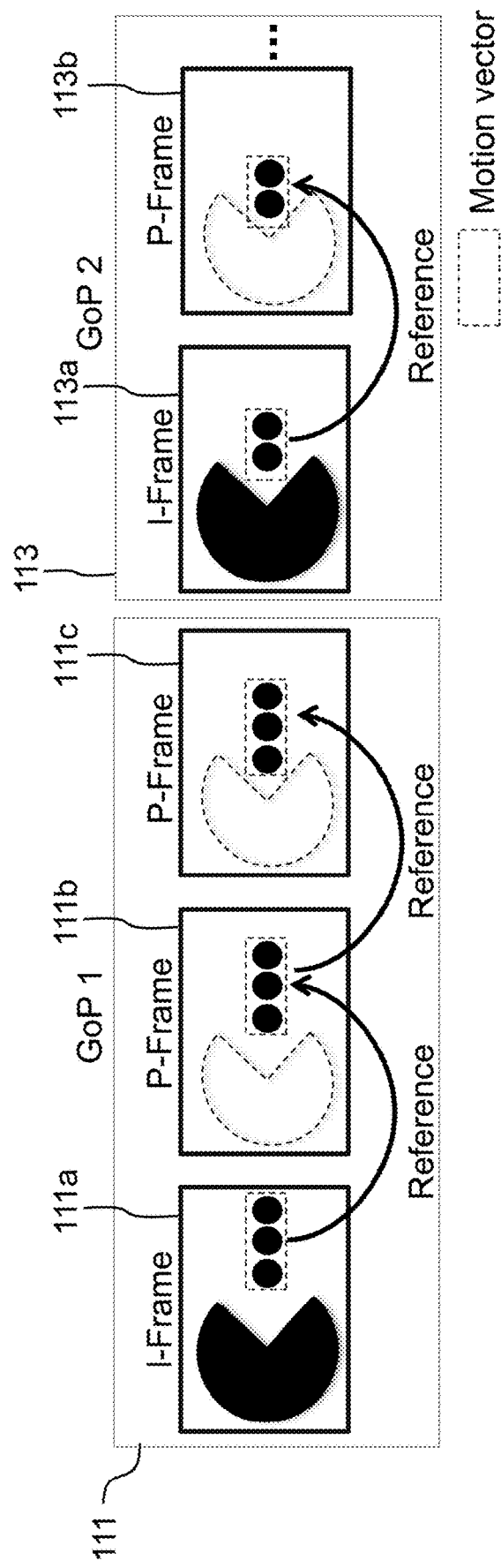
FIG. 2 shows a schematic diagram illustrating two exemplary groups of frames comprising a plurality of temporally successive video data frames as used by a transmitter communication device according to an embodiment.

FIG. 2 shows a more detailed view of the two exemplary groups of frames 111 and 113 illustrated in FIG. 1. In an embodiment, the processor 103 of the transmitter communication device 101, when processing the group of frames 111 shown in FIG. 2, is configured to select a first MCS for the first frame 111a, a second MCS for the second frame 111b and a third MCS for the third frame 111c. Likewise, when processing the group of frames 113 shown in FIG. 2, the processor 103 of the transmitter communication device 101 is configured to select a first MCS for the first frame 113a, a second MCS for the second frame 113b and so on for further frames of the group of frames 113, which follow the second frame 113b. As illustrated in FIG. 2, the first frame 111a could be an intra-coded frame (I-frame) and the second frame 111b of the group of frames 111 could be a predictive-coded frame (P-frame). Alternatively, the second frame 111b of the group of frames 111 could be a bidirectional predictive coded frame (B-frame).

In an embodiment, the processor 103, when processing, for instance, the group of frames 111 shown in FIG. 2, is configured to select the second MCS used for the second frame 111b to be spectrally more efficient, i.e. requiring less bandwidth than the first MCS used for the first frame 111a and/or the third MCS used for the third frame 111c to be spectrally more efficient than the second MCS used for the second frame 111b.

In an embodiment, the processor 103 of the transmitter communication device 101 is configured to identify the first MCS using a first integer index and the second MCS using a second integer index, wherein the first integer index is smaller than the second integer index. In an embodiment, the processor 103 of the transmitter communication device 101 is configured to identify each MCS by a MCS index value.

In an embodiment, the plurality of MCSs are implemented as logical blocks of the transmitter communication device 101, wherein each MCS can be identified by a MCS index value. In an embodiment, the transmitter communication device 101 further comprises a memory 107 configured to store a table containing a plurality of integer indices, in particular MCS index values, wherein each integer index is associated with, i.e. points to a respective modulation and coding scheme (MCS) of the plurality of modulation and coding schemes, which can be selected by the processor 103.

The exemplary groups of frames shown in FIG. 2 are the result of inter-frame coding, where differences between consecutive full pictures (so-called I frames) are represented as motion vectors that are included in intermediate frames, so-called P-frames (or Delta-frames). Since representing motion differences typically requires fewer bits than needed for a complete picture, inter-frame coding highly improves coding efficiency but also introduces a temporal dependency between the frames of a video stream.

In case of transmission errors, this temporal dependency can cause an error propagation of the missing or erroneous information among the video stream. This can be easily illustrated for the example of a conventional Group of Pictures (GoP) of 12 frames, which is defined by IPPPPPPPPPPP with one I-frame and 11 P-frames. Assuming that the video stream is encoded at 24 frames-per-second (fps): an error in frame 1 affects 12/24=500 ms of the decoded video in the spatial and temporal domain; an error in frame 2 affects 11/24=458 ms of the decoded video in the temporal domain; and an error in frame 12 affects 1/24=42 ms of the decoded video in the temporal domain.

Based on this source coding property, the processor 103 according to an embodiment adjusts MCS as a bounded, either decreasing or increasing function of video frame time. As will be appreciated, the processor 103 does not require knowledge of the absolute time. It can operate based on the frame position relative to the beginning of the video stream, which can be obtained as a time-index of the packets received at Layer 2 or higher, under the assumption that packets are received in order.

According to a first positive MCS adjustment variant an offset Δ is added to the MCS value of a user. The MCS offset may start with a value of 0 and strictly increases with the frame time. As a higher MCS transmits more bits per unit time, this variant increases spectral efficiency but also the risk of a packet loss for frames that are transmitted later in the stream. Thus, in an embodiment, the processor 103 is configured to select the second MCS by adding a positive integer offset value to the first integer index value for obtaining the second integer index value identifying the second MCS.

According to a second negative MCS adjustment variant an offset Δ is subtracted from the MCS value of a user. The MCS offset may start with a maximum value and strictly decreases with the frame time until it may reach 0. As a lower MCS offer more redundancy per data bit, this variant protects early packets in the stream at the cost of lower spectral efficiency. Thus, in an embodiment, the processor 103 is configured to select the second MCS by subtracting a first positive integer offset value from a reference integer index value for obtaining the first integer index value and subtracting a second positive integer offset value from the reference integer index value for obtaining the second integer index value identifying the second MCS, wherein the second positive integer offset value is smaller than the first positive integer offset value.

A third MCS adjustment variant, which is a combination of the first and second variants above, allows the second variant to use negative offsets for higher frame numbers or the first variant to use negative offsets for lower frame numbers and, thus, provides a larger degree-of-freedom for the MCS adaptation. Thus, in an embodiment the processor 103 is configured to select the second MCS by adding a first integer offset value to a reference integer index for obtaining the first integer index and adding a second integer offset value to the reference integer index for obtaining the second integer index identifying the second MCS, wherein the second integer offset value is greater than the first integer offset value and where each integer offset can be positive, negative or zero.

In an embodiment, the processor 103 is further configured to generate a modified current group of frames by removing the second frame from the current group of frames, wherein the communication interface 105 is configured to transmit the modified current group of frames to the receiver communication device 120. In an embodiment, the processor 103 is configured to remove the second frame from the current group of frames, in response to a synchronization request from the receiver communication device 120. A synchronization request from the receiver communication device 120 can be "observed" by the transmitter communication device 101 (i) directly as a signal (e.g., from uplink) or (ii) indirectly from a response to the synchronization request (i.e., an IDR frame placed in the video stream by the video data provider 140). The removal or dropping of packets can also be achieved using the first or second MCS adjustment variant described above. This is because, by selecting a specific MCS that indicates the dropping of packets, for example a very high, positive Δ for the first variant or a very high, negative Δ for the second variant, irrelevant video frames can be immediately dropped.

As already mentioned above, the video data can comprise only a single group of frames comprising a plurality of temporally successive video data frames, i.e. a video stream without a periodic group-of-pictures (GoP) structure. In such streams, an I-frame is sent at the beginning followed by P-frames. Additional I-frames are only transmitted, if another synchronization of the video stream is necessary (e.g., as a consequence of a packet loss). In this case, the processor 103 can be configured to synchronize the MCS offset to any I-frame in the stream. For the example of the first variant above, Δ=0 is applied for the packets of the initial I-frame, followed by an increase in Δ until another I-frame packet appears. This is repeated by applying Δ=0 for packets of this I-frame, followed by an increase until the next I-frame.

In an embodiment, the processor 103 of the transmitter communication device 101 is configured to select the second MCS on the basis of the temporal position of the second frame relative to the first frame of the current group of frames and on the basis of a profile associated with the receiver communication device 120. In an embodiment, the profile associated with the receiver communication device 120 can be a profile of a user of the receiver communication device 120 defining user-specific quality-of-experience (QoE) requirements. For instance, for a user profile defining less demanding QoE requirements the processor 103 could select a MCS which is spectrally more efficient than a MCS selected for a user profile having more demanding QoE requirements.

In an embodiment, the first frame is the temporally first frame of the current group of frames and the processor 103 of the transmitter communication device 101 is further configured to select the first MCS on the basis of a quality measure, in particular a SINR of the communication channel between the transmitter communication device 101 and the receiver communication device 120. In an embodiment this function can be provided by an adaptive modulation and coding (AMC) unit.

In the following, the embodiments above will be described in a more mathematical fashion. In this context reference is made to FIG. 3, which shows a table defining the corresponding mathematical notation.

Figure 4:
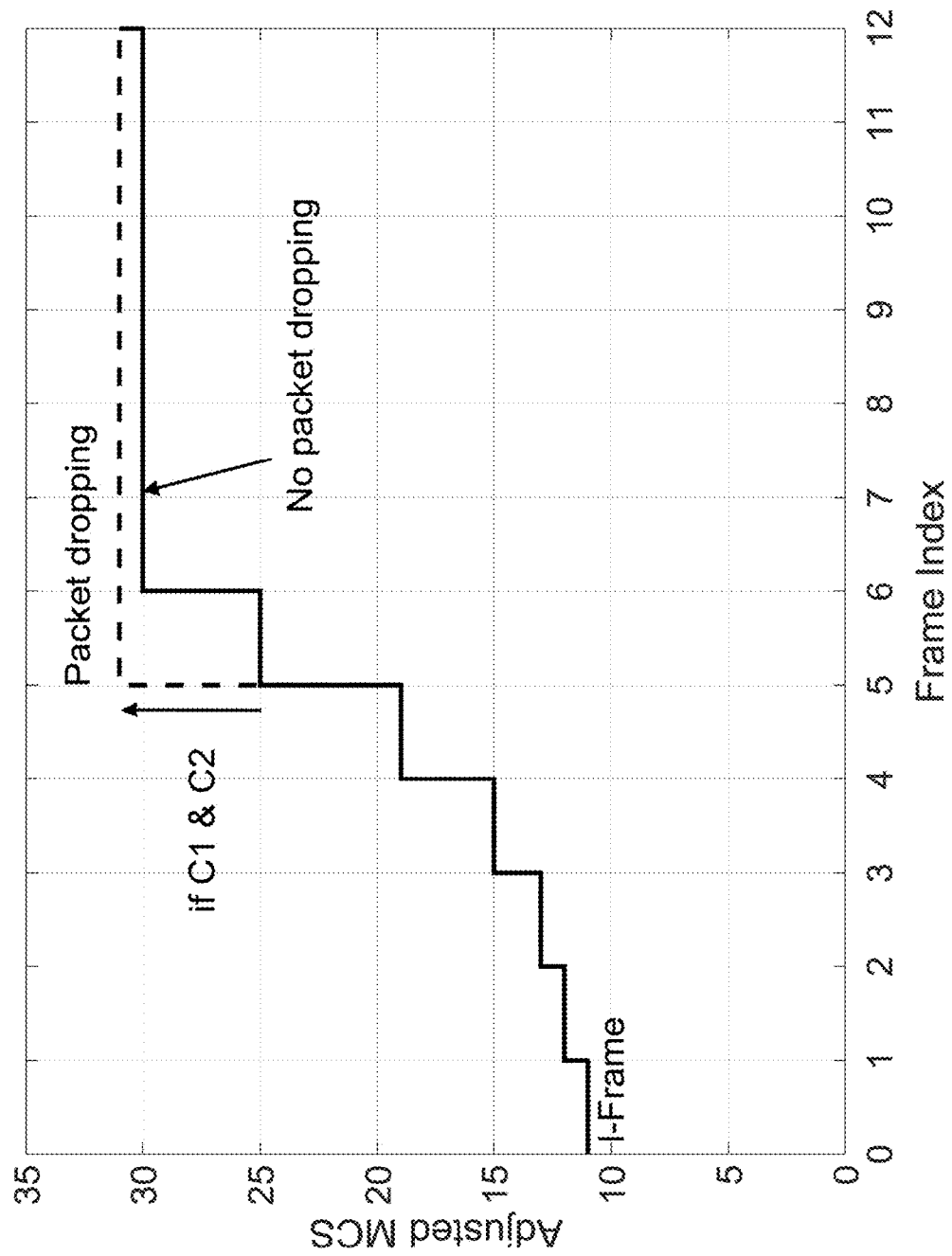
FIG. 4 shows a schematic diagram illustrating an exemplary adjustment of the modulation and coding scheme as a function of the frame position as implemented in a transmitter communication device according to an embodiment.

As already described above, according to an embodiment the transmitter communication device 101 provided an Unequal Error Protection (UEP) of frames of a video stream according to the position of the respective video frame inside the group of frames. According to an embodiment, this can be achieved by adding an offset $\Delta: M \times J \rightarrow Z^+$ to current MCS m'={1, 2, . . . , M} depending on m' and frame position j={1, 2, . . . , J} inside a group of frames or an aperiodic video stream. FIG. 4 shows a schematic diagram illustrating an exemplary adjustment of MCS as a function of the frame position, i.e. frame index as implemented in the transmitter communication device 101 according to an embodiment.

According to an embodiment, frames closer to the end of a group of frames can have a higher error rate but achieve a higher spectral efficiency. This accounts for packet relevance in spatial decoding and/or temporal decoding. In spatial decoding only the first frame of a GoP is an I-frame. The smallest offset Δ={0, 1, . . . , M} can be added here by the processor 103. In temporal decoding motion vectors closer to the end of a GoP affect a shorter time of the video stream. Increasing the error rate (or even dropping) such packets has a lower QoE impairment than packets of earlier frames.

Figure 5:
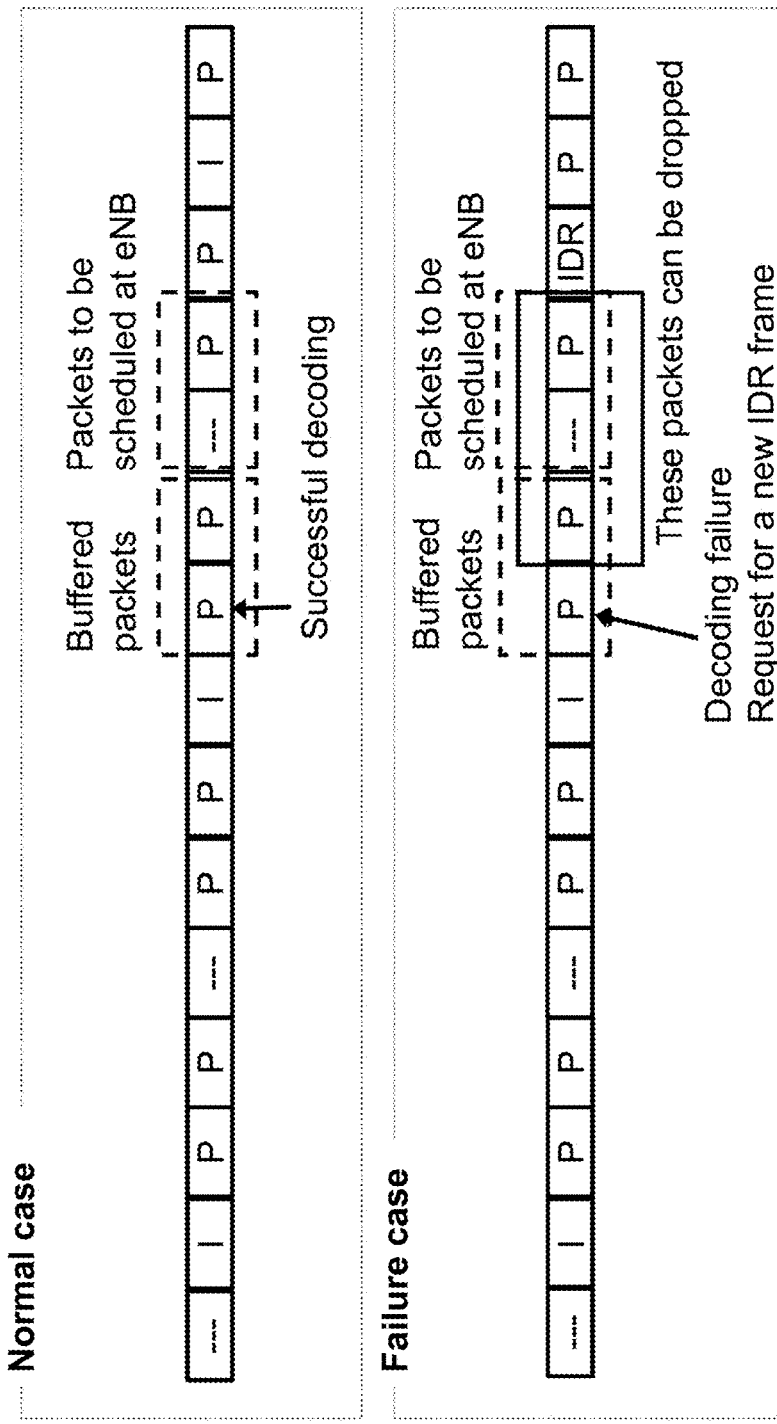
FIG. 5 shows a schematic diagram illustrating a frame dropping scheme implemented in a transmitter communication device according to an embodiment.

As already described above, in an embodiment the processor 103 is configured to generate a modified current group of frames by removing or dropping one or more frames from the current group of frames. This idea is further illustrated in FIG. 5. This dropping of frame can be considered to correspond to an infinite error rate or a very high MCS index. According to an embodiment, the processor 103 is configured to generate a modified current group of frames by removing or dropping one or more frames from the current group of frames in case the following two conditions C1 and C2 are met (as illustrated in FIG. 4 as well):

C1: Head-of-line blocking of delta-frame packets in base station queue; and

C2: IDR-frame is received from client.

As will be appreciated, these conditions C1 and C2 indicate an overload and a re-synchronization request of the receiver communication device 120 either due to lost packets or bitrate adaptation. The packets prior to the synchronization request will not be used by the receiver communication device 120 and, therefore, can be removed from the transmit queue of the transmitter communication device 101 without quality penalty (see example in FIG. 5). The result is higher spectral efficiency. Consequently, according to an embodiment frames, for which these conditions jointly hold, are immediately dropped from the queue of the transmitter communication device 101. This drop is indicated by $\Delta = |M|+1$.

According to an embodiment, the transmitter communication device 101 can increase the spectral efficiency of a ViLTE call in the uplink and downlink, with uplink as priority. According to an embodiment, spectral efficiency will be increased by UEP of P and B-frame data at ISO/OSI Layer 2. Per transmit-time-interval (TTI), the subframe of an ongoing ViLTE call receives MCS index m' with m'= $\{1, \ldots, M\}$ from the conventional AMC procedure. If a subframe contains H.264/5-encoded video data, the processor 103 assigns index m'+$\Delta$(m',j) as new MCS index m.

According to the first positive MCS adjustment variant, which has already been described above, a positive integer $\Delta$(m',j) increases the employed MCS index value, which leads to a higher spectral efficiency for the transmission of the corresponding P or B-frame. Nevertheless, since the used MCS index m is higher than the initial selected value m', the error rate of this transmission can increase. To reduce QoE degradation, the function $\Delta: M \times J \rightarrow Z+$ can be defined as a non-decreasing function over MCS-Index and video-frame position. The position of a video frame, in the current GoP of length J, is given by index j=$\{1, 2, \ldots, J\}$.

According to the second negative MCS adjustment variant, which has already been described above, a negative integer $\Delta$(m',j) will decrease the employed MCS index value. The MCS offset may start with a maximum absolute value that strictly decreases as function of the position of the frame within the current GoP, until reaching zero. Decreasing the MCS provides more redundancy per data bit and protects early packets in the stream at the cost of lower spectral efficiency.

According to an embodiment, the MCS adjustment is implemented at Layer 2 of the transmitter communication device 101. For a given GoP size, the offline algorithm receives as input the MCS index m', the frame index j and gives a unique solution, m. The only online component of the algorithm is the one deciding the input m' value based on the input SINR. The main variables and key parameters are summarized in the table of FIG. 3.

In the following, the video frame index j=0 denotes the I-frame, which will be considered as $P_0$ for notational convenience.

First, $U_P(j,m,t)$ is defined as the optimal utility of transmitting P ($P_i$, i=0, $\ldots$, j) frames with MCS up to m and at most t slots in the following way:

$$U_P(j, m, t) = \max_{0 \le i \le j} [U_P(i, m-1, t - \tau_{i+1,j,m}) - s_m \tau_{i+1,j,m}]$$

$$q(j, m, t) = \arg\max_{i} [U_P(i, m-1, t - \tau_{i+1,j,m}) - s_m \tau_{i+1,j,m}]$$

$$s_m = \begin{cases} 0 & \text{if } m' >= m \\ BLER(m, m') & \text{otherwise} \end{cases}$$

wherein $\tau_{j_1,j_2,m} = \lceil \sum_{k=j_1}^{j_2} L_k/R_m \rceil$ denotes is the number of slots required to deliver frames ($P_k$, k=$j_1, \ldots, j_2$) using MCS m and BLER(m,m') denotes the BLER of selecting output MCS m when input MCS is m'. The initial conditions are:

$U_P(j,m,t) = -\infty$ if $t<0$ $U_P(j,0,t) = -\infty$ if $j \ge 0, t \ge 0$ $U_P(-1,m,t) = 0$ if $m \ge 0, t \ge 0$ From the definition of $U_P(j,m,t)$ one can appreciate that $U_P(j,m+1,t) \ge U_P(j,m,t)$ and that $U_P(j,m,t+1) \ge U_P(j,m,t)$. Therefore, the optimal utility is always achieved at m=M and t=T:

$$U_P^* = \max_{j \ge 0} U_P(j, M, T)$$

$$j^* = \arg\max_{j \ge 0} U_P(j, M, T)$$

$$m^* = \min\{m: U_P(j^*, m, T) == U_P^*\}$$

$$t^* = \min\{t: U_P(j^*, m^*, t) == U_P^*\}$$

where j* achieves the optimal utility, indicating that P frames j>j* are dropped.

Finally, the algorithm determines the number of I/P frames transmitted, and the MCS for each transmitted video frame based on the result of utility optimization. The following steps are executed in order:

1. The number of slots allocated to I/P frames are determined on the basis of the following equation:

$$t^* = \min\{t: U_P(j^*, m^*, t) == U_{P^*}\}$$

2. The first frames are transmitted, and the rest discarded.
3. t=t*, j=j*, m=m*, i=q(j,m,t).
4. $P_k$, k=i+1, $\ldots$, j are transmitted with MCS m. If i==j, no frames are transmitted with MCS m.
5. If i<0, exit. Otherwise, t=t−$\tau_{i+1,j,m}$, j=i, m=m−1, i=q(j,m,t), go to Step 4.

Figure 6:
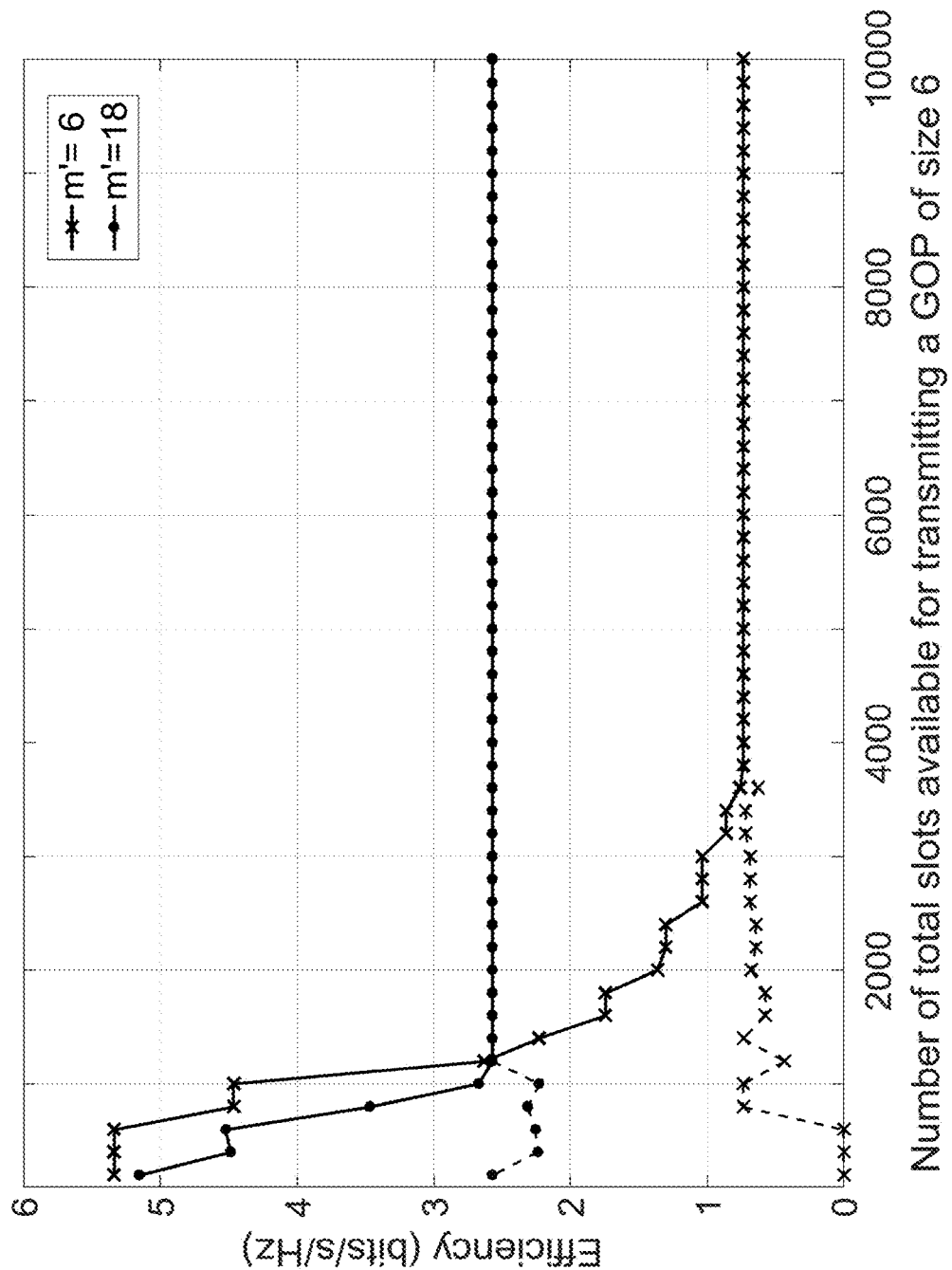
FIG. 6 shows a schematic diagram illustrating the efficiency of the MCS adjustment scheme implemented in a transmitter communication device according to an embodiment for a group of frames comprising 6 video data frames.
Figure 7:
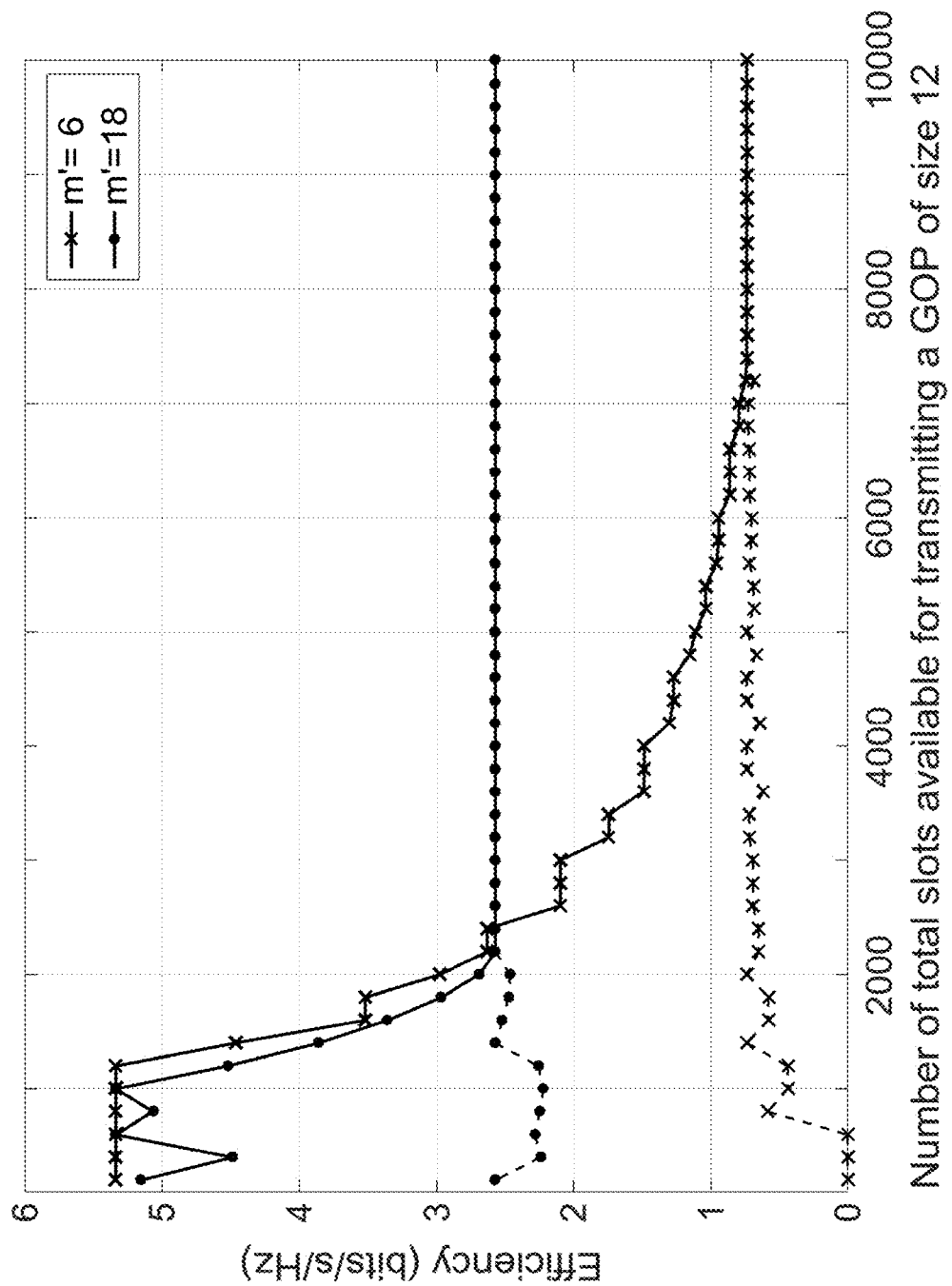
FIG. 7 shows a schematic diagram illustrating the efficiency of the MCS adjustment scheme implemented in a transmitter communication device according to an embodiment for a group of frames comprising 12 video data frames.

FIGS. 6 and 7 show respective diagrams illustrating the efficiency of the MCS adjustment scheme implemented in the transmitter communication device 101 according to an embodiment for the two exemplary cases of a group of frames comprising 6 video data frames and 12 video data frames, respectively. The x-axis of these figures shows the number of available slots to transmit a single group of frames (cross-marked line, m'=6: QPSK, SE=0.7393 (bit/s/Hz); dot-marked line, m=18: 64QAM, SE=2.5684 (bit/s/Hz)). The dashed lines of these figures stand for the baseline scheme and the solid lines are for the proposed UEP algorithm. As can be taken from these figures, embodiments of the application allow outperforming the baseline scheme in terms of spectral efficiency, especially for the case of low number of available slots.

Figure 8:
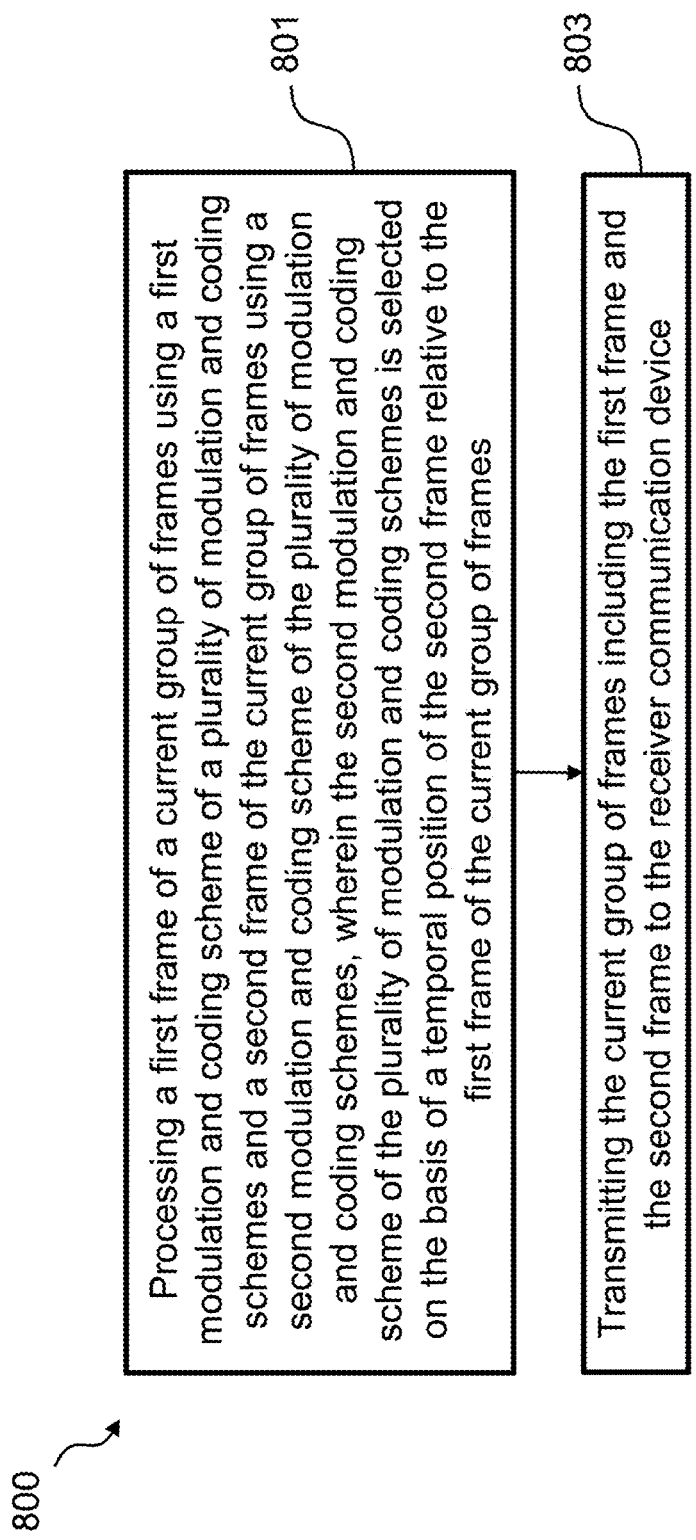
FIG. 8 shows a schematic diagram illustrating a corresponding method of providing video data according to an embodiment.

FIG. 8 shows a schematic diagram illustrating a corresponding method 800 for providing video data to the receiver communication device 120. The method 800 comprises the steps of: processing 801 a first frame of a current, i.e. currently processed group of frames using a first modulation and coding scheme of a plurality of modulation and coding schemes and a second frame of the current group of frames using a second modulation and coding scheme of the plurality of modulation and coding schemes, wherein the second modulation and coding scheme of the plurality of modulation and coding schemes is selected on the basis of a temporal position of the second frame relative to the first frame of the current group of frames; and transmitting 803 the current group of frames including the first frame and the second frame to the receiver communication device 120.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the application beyond those described herein. While the present application has been described with reference to one or more particular embodiments, those skilled in the art recognize that many changes may be made thereto without departing from the scope of the present application. It is therefore to be understood that within the scope of the appended claims and their equivalents, the application may be practiced otherwise than as specifically described herein.

What is claimed is:

1. A transmitter communication device configured to provide video data to a receiver communication device, the video data comprising one or more groups of frames, each group of frames comprising a plurality of temporally successive frames, the transmitter communication device comprising:
    a processor configured to:
        process a first frame of a current group of frames using a first modulation and coding scheme of a plurality of modulation and coding schemes;
        process a second frame of the current group of frames using a second modulation and coding scheme of the plurality of modulation and coding schemes; and
        select the second modulation and coding scheme of the plurality of modulation and coding schemes on the basis of a temporal position of the second frame relative to the first frame of the current group of frames; and
    a communication interface configured to transmit the current group of frames including the first frame and the second frame to the receiver communication device.

2. The transmitter communication device of claim 1, wherein the first frame of the current group of frames temporally precedes the second frame of the current group of frames, and wherein the second modulation and coding scheme is spectrally more efficient than the first modulation and coding scheme.

3. The transmitter communication device of claim 1, wherein the processor is further configured to identify the first modulation and coding scheme using a first integer index and the second modulation and coding scheme using a second integer index, and wherein the first integer index is smaller than the second integer index.

4. The transmitter communication device of claim 3, wherein the transmitter communication device further comprises a memory configured to store a table containing a plurality of integer indices, and wherein each integer index is associated with a respective modulation and coding scheme of the plurality of modulation and coding schemes.

5. The transmitter communication device of claim 3, wherein the processor is configured to select the second modulation and coding scheme of the plurality of modulation and coding schemes based on the temporal position of the second frame relative to the first frame of the current group of frames by adding an offset value to the first integer index for obtaining the second integer index.

6. The transmitter communication device of claim 1, wherein the processor is further configured to generate a modified current group of frames by removing the second frame from the current group of frames, and wherein the communication interface is configured to transmit the modified current group of frames to the receiver communication device.

7. The transmitter communication device of claim 1, wherein the first frame of the current group of frames is an intra-coded frame and the second frame of the current group of frames is a predictive-coded frame or a bidirectional predictive coded frame.

8. The transmitter communication device of claim 1, wherein the processor is configured to select the second modulation and coding scheme of the plurality of modulation and coding schemes based on the temporal position of the second frame relative to the first frame of the current group of frames and based on a profile associated with the receiver communication device.

9. The transmitter communication device of claim 1, wherein the first frame is the temporally first frame of the current group of frames, and wherein the processor is further configured to select the first modulation and coding scheme of the plurality of modulation and coding schemes based on a quality measure of a communication channel between the transmitter communication device and the receiver communication device.

10. The transmitter communication device of claim 1, wherein the communication interface is further configured to receive the video data from a video data provider, wherein the processor is further configured to extract the temporal position of the second frame and a temporal position of the first frame of the current group of frames from the video data provided by the video data provider.

11. A method by a transmitter communication device for providing video data to a receiver communication device, the video data comprising one or more groups of frames, each group of frames comprising a plurality of temporally successive frames, the method comprising:
- processing a first frame of a current group of frames using a first modulation and coding scheme of a plurality of modulation and coding schemes; and
- processing a second frame of the current group of frames using a second modulation and coding scheme of the plurality of modulation and coding schemes, wherein the second modulation and coding scheme of the plurality of modulation and coding schemes is selected based on a temporal position of the second frame relative to the first frame of the current group of frames; and
- transmitting the current group of frames including the first frame and the second frame to the receiver communication device.

12. The method of claim 11, wherein the first frame of the current group of frames temporally precedes the second frame of the current group of frames, and wherein the second modulation and coding scheme is spectrally more efficient than the first modulation and coding scheme.

13. The method of claim 11, further comprising identifying the first modulation and coding scheme using a first integer index and the second modulation and coding scheme using a second integer index, wherein the first integer index is smaller than the second integer index.

14. The method of claim 13, wherein a table containing a plurality of integer indices is stored, and wherein each integer index is associated with a respective modulation and coding scheme of the plurality of modulation and coding schemes.

15. The method of claim 13, further comprising selecting the second modulation and coding scheme of the plurality of modulation and coding schemes on the basis of the temporal position of the second frame relative to the first frame of the current group of frames by adding an offset value to the first integer index for obtaining the second integer index.

16. The method of claim 11, further comprising generating a modified current group of frames by removing the second frame from the current group of frames and transmitting the modified current group of frames to the receiver communication device.

17. The method of claim 11, wherein the first frame of the current group of frames is an intra-coded frame and the second frame of the current group of frames is a predictive-coded frame or a bidirectional predictive coded frame.

18. The method of claim 11, further comprising selecting the second modulation and coding scheme of the plurality of modulation and coding schemes based on the temporal position of the second frame relative to the first frame of the current group of frames and based on a profile associated with the receiver communication device.

19. The method of claim 11, wherein the first frame is the temporally first frame of the current group of frames, and wherein the method further comprises selecting the first modulation and coding scheme of the plurality of modulation and coding schemes based on a quality measure of a communication channel between the transmitter communication device and the receiver communication device.

20. The method of claim 11, further comprising:
- receiving the video data from a video data provider; and
- extracting the temporal position of the second frame and a temporal position of the first frame of the current group of frames from the video data provided by the video data provider.

\* \* \* \* \*